United States Patent [19]

Riedel

[11] 4,339,990
[45] Jul. 20, 1982

[54] MOVABLE WALL FOR A PNEUMATIC BOOSTER

[76] Inventor: Peter Riedel, Schulstrasse 41, 6234 Hattersheim, Fed. Rep. of Germany

[21] Appl. No.: 205,550

[22] Filed: Nov. 10, 1980

[30] Foreign Application Priority Data

Dec. 20, 1979 [DE] Fed. Rep. of Germany ....... 2951372

[51] Int. Cl.$^3$ ........................... F01B 19/00; F16J 3/02
[52] U.S. Cl. ...................................................... 92/99
[58] Field of Search .............. 92/99, 98 D, 98 R, 100, 92/101, 210

[56] References Cited

U.S. PATENT DOCUMENTS

| | | | |
|---|---|---|---|
| 2,293,854 | 8/1942 | Sauzedde | 92/98 D |
| 2,826,153 | 3/1958 | Johnson | 92/99 |
| 2,977,935 | 4/1961 | Randol | 92/100 |
| 3,385,167 | 5/1968 | Wilson | 92/99 |
| 3,385,168 | 5/1968 | Fineman | 92/99 |
| 3,981,227 | 9/1976 | Azuma | 92/99 |
| 4,020,749 | 5/1977 | Muller | 92/99 |
| 4,043,251 | 8/1977 | Ohmi | 92/99 |
| 4,257,312 | 3/1981 | Ohmi | 92/99 |
| 4,270,353 | 6/1981 | Thomas | 92/98 D |

FOREIGN PATENT DOCUMENTS

| | | | |
|---|---|---|---|
| 458931 | 4/1928 | Fed. Rep. of Germany | 92/101 |
| 1144566 | 3/1969 | United Kingdom . | |

*Primary Examiner*—Abraham Hershkovitz
*Assistant Examiner*—Ali Tangoren
*Attorney, Agent, or Firm*—John T. O'Halloran; Alfred C. Hill

[57] ABSTRACT

Pneumatic boosters basically comprise a casing and at least one movable wall disposed therein dividing the casing into two chambers. The differential of pressure between a low pressure in one of the two chambers and atmospheric pressure in the other of the two chambers provides the boosting effect. The diaphragm plate of the movable wall is normally made of relatively heavy sheet steel. According to the present invention a weight reduction and a saving of material is accomplished by providing openings in at least that portion of the diaphragm plate that extends substantially radially from the axis of the booster.

6 Claims, 3 Drawing Figures

MOVABLE WALL FOR A PNEUMATIC BOOSTER

BACKGROUND OF THE INVENTION

The present invention relates to a pneumatic booster, and more particularly to a vacuum brake booster for an automotive vehicle comprising basically a casing having at least one movable wall disposed therein dividing the casing into two chambers, with the differential of pressure between a low pressure in one of the two chambers and atmospheric pressure in the other of the two chambers acting on the movable wall providing the boosting effect. The movable wall includes at least one rigid diaphragm plate and one flexible diaphragm. A pneumatic booster of the above-mentioned type is disclosed in German patent DE-OS No. 2,808,622. Another pneumatic booster of the above-mentioned type is disclosed in a copending application of P. Reidel and L. Haar, Ser. No. 143,384, filed Apr. 24, 1980, whose disclosure is incorporated herein by reference.

The known vacuum brake boosters are unable to comply with the vehicle manufacturers' demands for a lowest possible weight of brake systems without the safety and operability of the devices being impaired. Several proposals have been made with respect to the weight reduction of vacuum brake boosters, which would, however, necessitate a complete reconstruction of the brake booster.

SUMMARY OF THE INVENTION

It is, therefore, an object of the present invention to provide a pneumatic booster of the type referred to hereinabove which results in a substantial saving of weight without the necessity of using costly materials or a complete reconstruction of the booster.

A feature of the present invention is the provision of a movable wall for a vacuum brake booster operated on by a differential of pressure to provide an increased brake force comprising a rigid diaphragm plate having one portion thereof extending substantially radially from a longitudinal axis of the booster, the plate containing therein a plurality of openings for weight reduction and material saving; and a flexible diaphragm disposed in an overlaying relationship with one surface of the one portion covering the openings.

The present invention is based on the knowledge that the conventional diaphragm plate is oversized, in particular in the portion extending radially outward from the longitudinal axis of the booster. In contrast to this, the portion of the diaphragm plate extending radially in accordance with the present invention includes by a grate-like or sieve-like structure, straps of which are sufficient to absorb the forces acting from the diaphragm onto the diaphragm plate. The number of openings is optional. Since the weight of the diaphragm plate made from sheet steel in the known boosters amounts to between 15 and 23% of the total weight of the booster, depending on the construction and size of booster, the invention will result in a substantial saving of weight. Material will also be saved.

With respect to the distribution of the forces acting on the diaphragm plate, it is useful to have straps between the openings which extend in a radial direction. A preferred embodiment of the invention is that the openings are dimensioned in at least one direction such that it is impossible for the flexible diaphragm to squeeze into or through the openings. Thus, the diaphragm is prevented from being damaged. Preferably, the openings have a long and short axis and are arranged such that their long axis extend at least approximately in a radial direction of the diaphragm plate. In consideration of the conventional thickness of the diaphragms it is suggested that the openings' shorter axis be 3 to 5 mm (millimeters) wide. To achieve a construction of the grate arrangement as simple as possible, without running the risk that the short axis of the openings get too wide, it is advisable that the length of the openings is different in the direction of the long axis and equal in the direction of the short axis. A particularly simple way to manufacture these openings is to punch the openings out of a piece of sheet steel. To avoid damage of the flexible rolling diaphragm by the punching burrs, it is advantageous to have the openings punched from the side of the piece of sheet steel close to the diaphragm.

To permit free choice of arrangement and size of the openings, it is an advantage that a means is provided between the flexible diaphragm and the diaphragm plate which prevents the diaphragm from squeezing into and through the openings. This means may be a disc covering the openings or grating.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
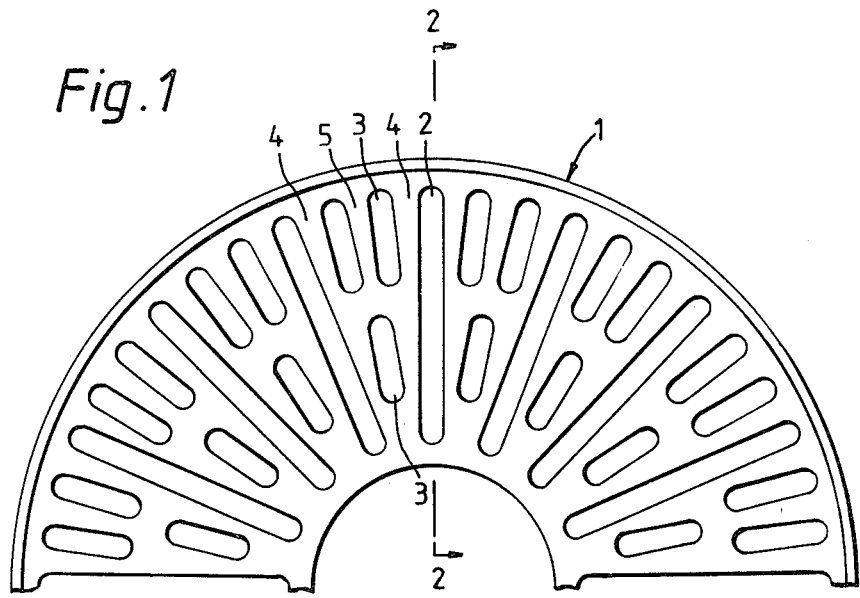
FIG. 1 is a partial front view of first and second embodiments of a diaphragm plate in accordance with the principles of the present invention.

FIG. 1 shows in the upper portion thereof a partial front view of a first embodiment of a diaphragm plate 1 having an arrangement of openings 2 and 3 requiring no special means to prevent a flexible diaphragm from squeezing into or through openings 2 and 3. Openings 2 and 3 have a long and a short axis and are arranged such that the long axis extends in a radial direction. The long axes of openings 2 and 3 are different, whereas the short axes are equal. The straps 4 and 5 formed between openings 2 and 3 extend likewise in a radial direction.

In the lower part of FIG. 1 a second embodiment of diaphragm plate 1 is shown having openings 6 which are shaped like annular segmments. Between openings 6 straps 7 are provided extending in a radial direction.

Figure 2:
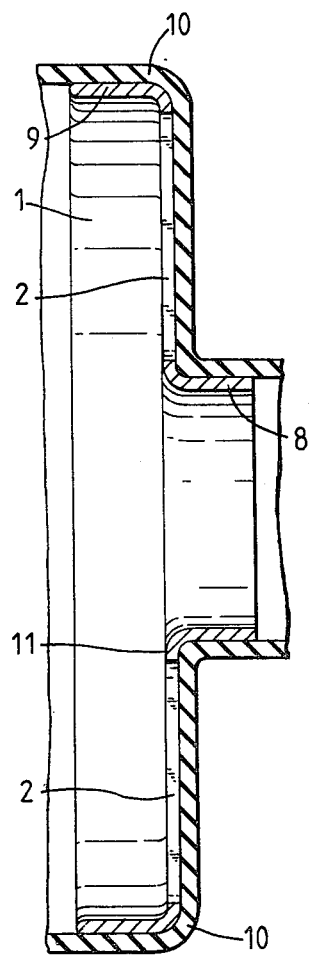
FIG. 2 is a cross sectional view of the entire diaphragm plate of the first embodiment taken along line 2-2 of FIG. 1.

FIG. 2 shows a cross sectional view of the entire diaphragm plate 1 of the first embodiment taken along line 2-2 of FIG. 1. Diaphragm plate 1 has at its inner radius a portion 8 extending axially, which serves for attachment to a control casing of a vacuum brake booster. At its outer radius, a portion 9 is provided which extends axially. A portion 11 extending radially between portions 8 and 9 carries openings 2 and 3 (only opening 2 being shown). The flexible diaphragm 10 abuts the entire outer surface of the diaphragm plate 1 including portions 8, 9 and 11 and thus closes openings 2 and 3 in portion 11.

Openings 2 and 3 can be manufactured by punching, for example. The punch is performed from the side on which flexible diaphragm 10 will be subsequently located. This will prevent the punching burrs from digging into the rubberlike material of diaphragm 10 and destroying the same.

Figure 3:
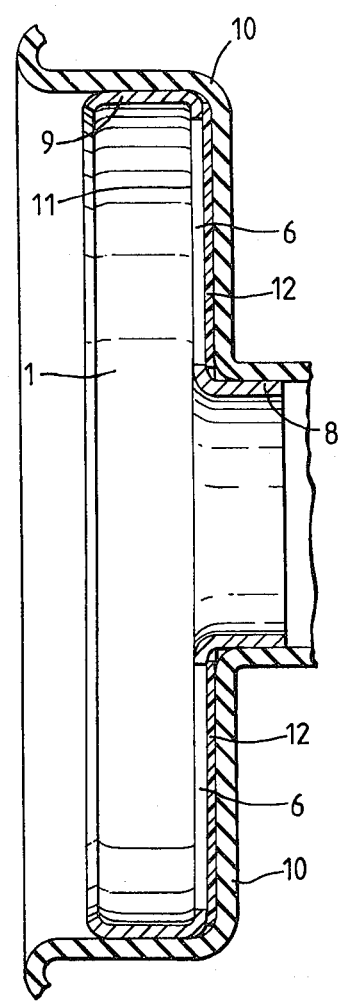
FIG. 3 is a cross sectional view of the entire diaphragm plate of the second embodiment taken along line 3-3 of FIG. 1.

FIG. 3 shows a cross sectional view of the entire diaphragm plate 1 of the second embodiment taken along line 3-3 of FIG. 1, which is provided with wide openings 6. Diaphragm plate 1 of this embodiment likewise includes portion 11 carrying openings 6 disposed between portions 8 and 9 extending axially as described with respect to FIG. 2. A thin disc 12 is located between portion 11 extending radially and diaphragm 10 which prevents diaphragm 10 from squeezing into or through openings 6. Disc 12 is preferably made of a light-weight synthetic product. In place of the disc a grate may be provided.

While I have described above the principles of my invention in connection with specific apparatus, it is to be clearly understood that this description is made only by way of example and not as limitation to the scope of my invention as set forth in the objects thereof and in the accompanying claims.

I claim:

1. A movable wall for a vacuum brake booster operated on by a differential of pressure to provide an increased brake force comprising:
a rigid, non-flexible metallic diaphragm plate including a first portion extending in a first direction substantially parallel to a longitudinal axis of said booster having a first diameter, a second portion extending in a second direction opposite to said first direction substantially parallel to said axis having a second diameter greater than said first diameter and a third portion extending substantially radially between adjacent ends of said first and second portions, said third portion containing therein a plurality of openings for weight reduction and material savings;
Strap members disposed between said openings and extending in a radial direction to absorb forces acting on said movable wall;
a flexible diaphragm disposed in a continuously abutting relationship with the outer surface of said first and second portions and a continuously parallel overlying relationship with one surface of said third portion covering said plurality of openings, said one surface of said third portion being a continuation of said outer surface of said first and second portions and said diaphragm is subjected to a higher of two pressures providing said differential of pressure directed only toward said one surface of said third portion; and
means disposed between said one surface of said third portion and said diaphragm to prevent said diaphragm squeezing into said openings.

2. A wall according to claim 1, wherein said third portion is sieve-like.

3. A wall according to claim 1, wherein
each of said openings have a long axis and a short axis, and
each of said openings are oriented so that said long axis extends substantially radially.

4. A wall according to claim 3, wherein
each of said openings has a width along said short axis equal to 3 to 5 millimeters.

5. A wall according to claim 4, wherein
each of said openings has said width, and
certain of said openings has a length along said long axis different than the length along said axis of other of said openings.

6. A wall according to claim 1, wherein
said means includes a disc covering said openings.

* * * * *

UNITED STATES PATENT OFFICE
CERTIFICATE OF CORRECTION

PATENT NO. : 4,339,990
DATED : July 20, 1982
INVENTOR(S) : Peter Riedel

It is certified that error appears in the above-identified patent and that said Letters Patent are hereby corrected as shown below:

On the Title Page, left-hand column,
between [76] and [21]
insert --[73] Assignee: ITT Industries, New York, N.Y.--

Signed and Sealed this

Twenty-seventh Day of December 1983

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,339,990
DATED : July 20, 1982
INVENTOR(S) : Peter Riedel

It is certified that error appears in the above—identified patent and that said Letters Patent is hereby corrected as shown below:

On the Title Page, left-hand column,
between [76] and [21]
insert --[73] Assignee: ITT Industries, Inc., New York, N.Y.--

This certificate supersedes Certificate of Correction issued December 27, 1983.

Signed and Sealed this

Tenth Day of April 1984

[SEAL]

Attest:

GERALD J. MOSSINGHOFF

Attesting Officer    Commissioner of Patents and Trademarks